United States Patent
Munsell et al.

(10) Patent No.: US 8,814,643 B2
(45) Date of Patent: Aug. 26, 2014

(54) CHALLENGE SEARCH QUERY GAME

(75) Inventors: Parrish Munsell, Woodinville, WA (US); David Hoppe, Seattle, WA (US); Mark W. Parker, Coupeville, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 12/913,622

(22) Filed: Oct. 27, 2010

(65) Prior Publication Data

US 2012/0108306 A1 May 3, 2012

(51) Int. Cl.
| | |
|---|---|
| *A63F 9/24* | (2006.01) |
| *G06Q 30/00* | (2012.01) |
| *G07F 17/32* | (2006.01) |
| *A63F 13/12* | (2006.01) |
| *A63F 13/10* | (2006.01) |

(52) U.S. Cl.
CPC ........... *A63F 13/10* (2013.01); *A63F 2300/552* (2013.01); *G07F 17/32* (2013.01); *A63F 2300/8064* (2013.01); *A63F 13/12* (2013.01); *A63F 2300/407* (2013.01); *A63F 2300/5506* (2013.01)
USPC ............................................. 463/9; 705/14.4

(58) Field of Classification Search
USPC ............................................. 463/9; 705/14.4
See application file for complete search history.

(56) References Cited

U.S. PATENT DOCUMENTS

| | | | |
|---|---|---|---|
| 6,978,253 | B2 | 12/2005 | Lin |
| 2001/0049661 | A1 | 12/2001 | Power et al. |
| 2002/0046087 | A1 * | 4/2002 | Hey .................................. 705/14 |
| 2002/0100040 | A1 | 7/2002 | Bull |
| 2002/0138342 | A1 | 9/2002 | Clark et al. |
| 2004/0186771 | A1 * | 9/2004 | Squires ........................... 705/14 |
| 2005/0054404 | A1 * | 3/2005 | Baerlocher ....................... 463/9 |
| 2005/0255901 | A1 * | 11/2005 | Kreutzer ........................... 463/9 |
| 2007/0033107 | A1 * | 2/2007 | Ubale et al. ..................... 705/14 |
| 2007/0192179 | A1 * | 8/2007 | Van Luchene ................. 705/14 |
| 2008/0102933 | A1 | 5/2008 | Jones et al. |
| 2008/0281704 | A1 * | 11/2008 | Shuhy et al. .................... 705/14 |
| 2009/0005003 | A1 | 1/2009 | Hartwell |
| 2010/0069151 | A1 | 3/2010 | Suchocki |
| 2010/0124991 | A1 | 5/2010 | O'Sullivan et al. |
| 2011/0112915 | A1 * | 5/2011 | Geer et al. ................. 705/14.73 |

OTHER PUBLICATIONS

Tel-Aviv, "Come2play Releases Virtual Currency Monetization Platform", Retrieved at << http://www.come2play.com/pressroom.asp >>, Sep. 8, 2009, pp. 3.

(Continued)

*Primary Examiner* — Lawrence Galka
(74) *Attorney, Agent, or Firm* — Micah Goldsmith; Glen Johnson; Micky Minhas (57) ABSTRACT

The present disclosure is directed to challenge search query game systems and methods wherein search queries are integrated into game play activities. In one example approach, a challenge search query game system may include a search server configured to receive a challenge query from a game program in response to an in-game action by a game player, and retrieve a challenge in response to the challenge query. The challenge may include one or more clues and a solution. The search server may further be configured to send the challenge to the game program for display in the game, causing the game program to store the challenge and present a first clue from the one or more clues to the game player.

15 Claims, 4 Drawing Sheets

(56) References Cited

OTHER PUBLICATIONS

Burns, Enid, "NeoEdge Launches Ad-Supported Game Player", Retrieved at << http://www.clickz.com/clickz/news/1706020/neoedge-launches-ad-supported-game-player >>, Feb. 26, 2007, pp. 8.

State Intellectual Property Office of China, Office Action of Chinese Patent Application No. 201110355005.2, Nov. 28, 2013, 6 pages.

* cited by examiner

CHALLENGE SEARCH QUERY GAME

BACKGROUND

Casual social games, e.g., games published on webpages and/or social networks on the internet, may encourage game players to play multiple times per day by providing in-game rewards, e.g., on a fixed schedule. Such in-game rewards, e.g., virtual money and/or game advancement, may be earned or achieved when a game player completes various mini-games (or specific tasks or challenges) within the published game. Additionally, a game player may invite others, e.g., from the game player's social graph, to participate with and/or assist in game play; thereby leading to an increase in a published game's user base.

Such games published by a game publisher may be substantially free to play; however, in some examples, a game player may pay real money to the game publisher in order to advance in a game, e.g., to save time. In this way, the game publisher generates revenue. However, only a small fraction of the user base for a casual social game will ever enter into a paying transaction in this manner, and accordingly most casual social games have not lived up to their revenue generation potential.

SUMMARY

The present disclosure is directed to challenge search query game systems and methods wherein search queries are integrated into game play activities. In one example approach, a challenge search query game system may include a search server configured to receive a challenge query from a game program in response to an in-game action by a game player, and retrieve a challenge in response to the challenge query. The challenge may include one or more clues and a solution. The search server may further be configured to send the challenge to the game program for display in the game, causing the game program to store the challenge and present a first clue from the one or more clues to the game player.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 2:
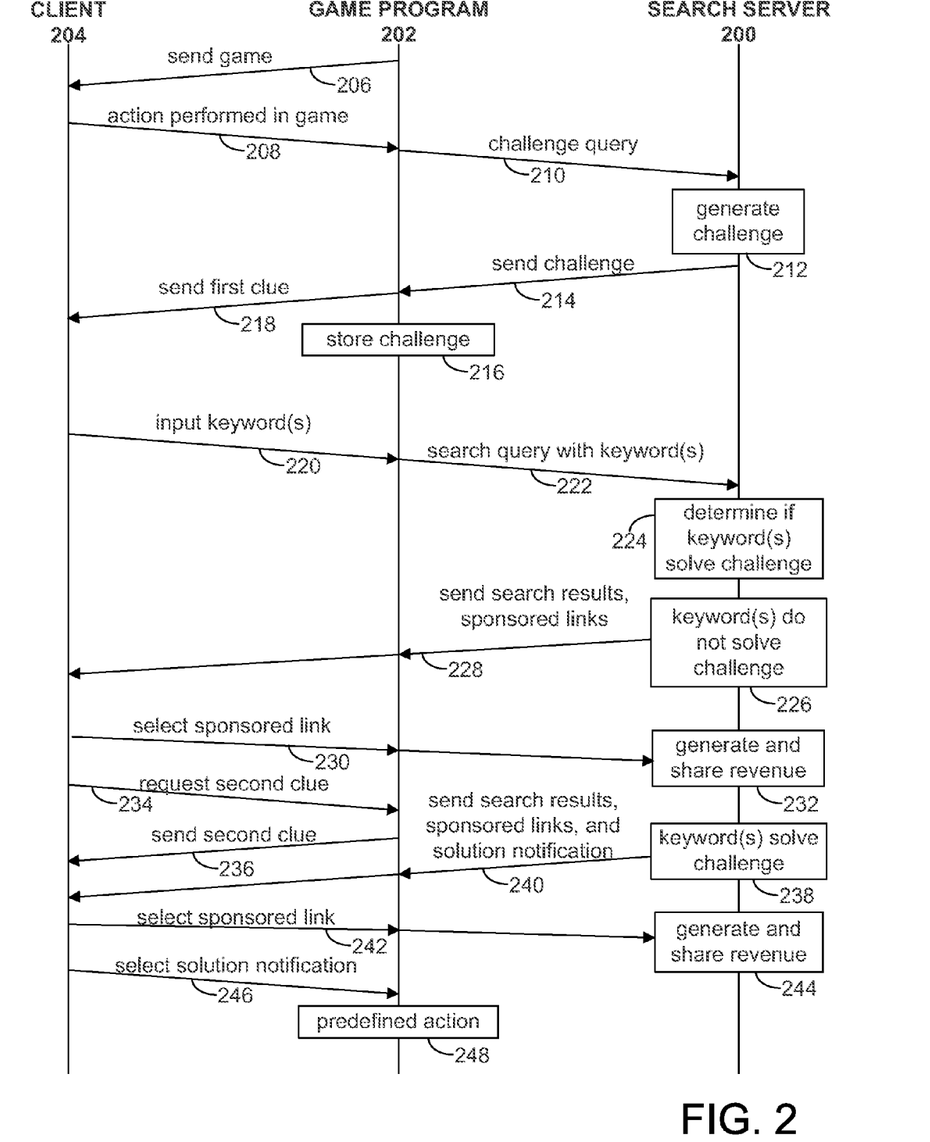
FIG. 2 is a communications flow diagram illustrating communications among a search server, a game program, and a client device of a challenge search query game system during an example challenge search query mini-game in a game published by a game publisher, according to one embodiment.
Figure 3:
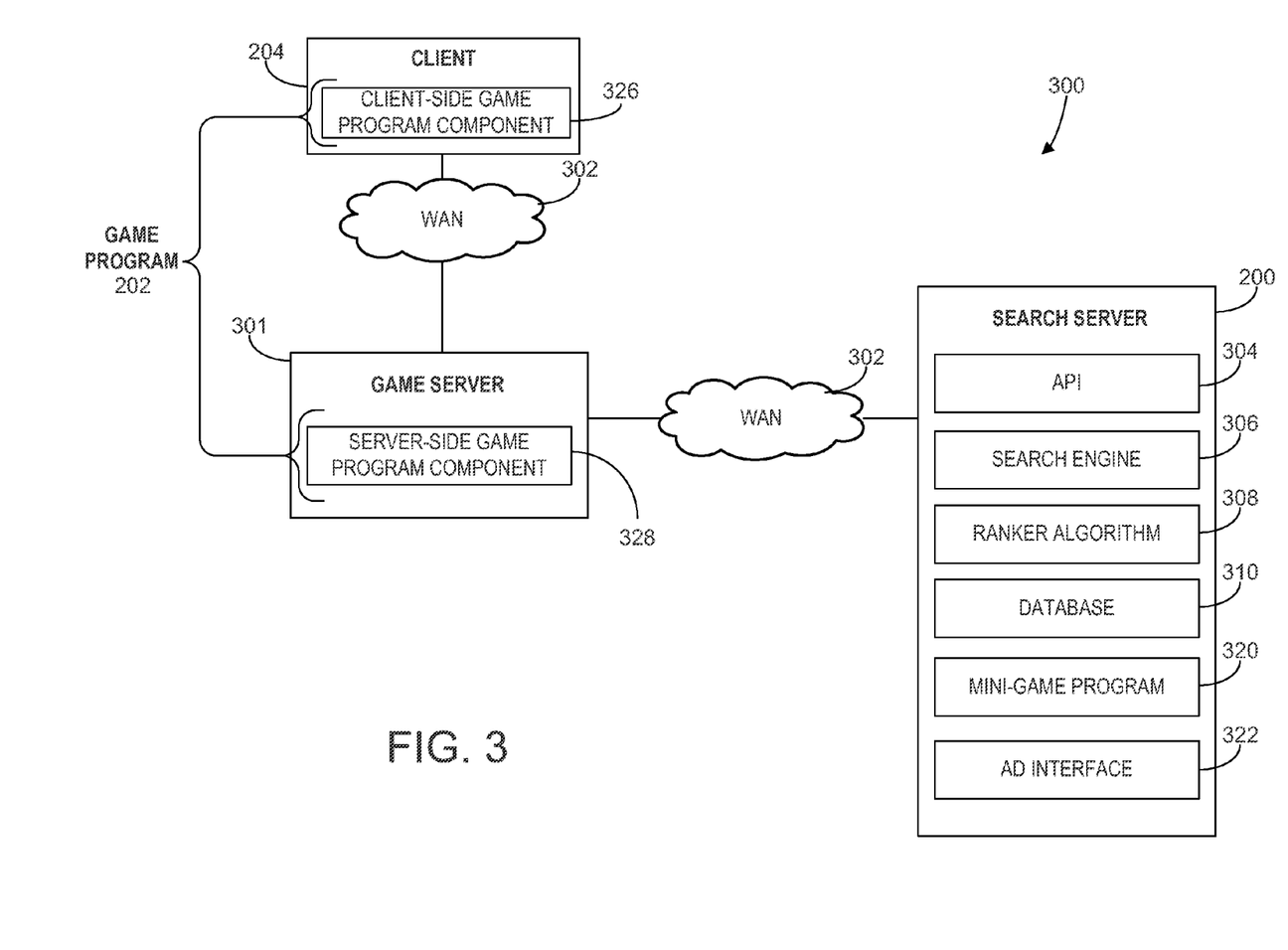
FIG. 3 is a schematic view of a challenge search query game system, according to one embodiment.

The present disclosure is directed to a challenge search query game system, an example of which is shown in FIG. 3, including a search server that is configured to serve an in-game mini-game to a game program. The game program in a challenge search query game system provides a game to a game player in a graphical user interface on a client device as shown in FIGS. 1A, 1B, 1C, and 1D, for example. The game program communicates with a search server and a client device, for example as shown in the communications flow diagram of FIG. 2, to provide challenges for display in a game which cause a game player to perform one or more searches to solve the challenge. For the game player, participating in such a search integrated gaming experience may provide access to game credit and/or advancement without having to spend real money to achieve this privilege. In addition, such search integrated games may increase the global query share and ad revenue for a search engine in operation with such a game.

Figure 1A:
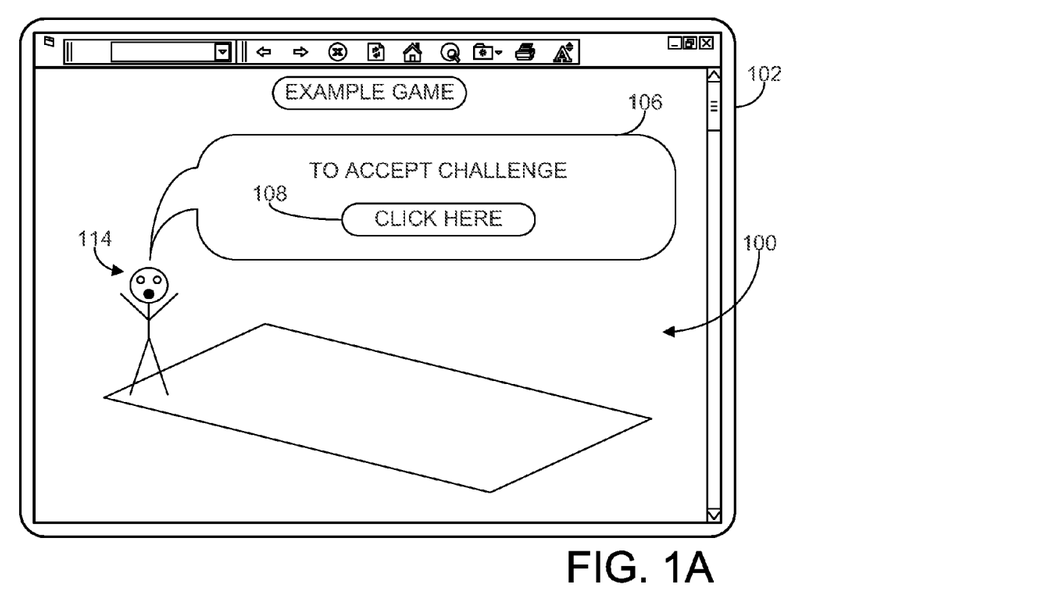
FIGS. 1A, 1B, 1C, and 1D are schematic views illustrating a graphical user interface of an example game including a challenge search query mini-game, according to one embodiment.

FIG. 1A shows an example search integrated game 100. Game 100 may published by a game publisher and provided through a game program. As described in more detail below, the game program may include one or both of a client-side game component and a server-side game component. In some examples, the game may be provided within a social network or other third party website. In other examples, the game may be provided through a dedicated game website, e.g., a game publisher website.

For example, game 100 may be accessed by a game player through a browser 102 or any other suitable interface. Such an interface may be running on a client device, e.g., a personal computer, a mobile device, a cell phone, etc.

In some examples, in order to initiate game 100, a game player may supply credentials to a game program which publishes the game. For example, a game player may log-in to or register with the game program in order to play the game. In doing so, the game player may submit profile information to the game program, such as age, sex, location, etc. Additionally, a game player may be provided various privacy options by the game program. For example, a game player may opt-in to share personal information with the game program or a search server. However, in other examples, a game player may play the game in a substantially anonymous fashion.

A game player may interact with game 100 in a variety of ways. For example, a game player may interact with game 100 via keypad input, speech input, gesture input, mouse input, or a dedicated game controller.

Game 100 may be any kind of game including one or more challenges and various in-game rewards or advancement opportunities. For example, game 100 may be a virtual board game, a role-playing game, a word game, etc. Namely, it should be understood that game 100 illustrated in FIGS. 1A, 1B, 1C, and 1D is exemplary in nature and that these specific embodiments or examples are not to be considered in a limiting sense, because numerous variations are possible.

Game 100 may include a plurality of options and elements. For example the game may present a plurality of different challenge options to a player from which they can select. Additionally, the game may provide various indications of a level of advancement, amount of virtual money earned, number of points earned, etc.

In some examples, game 100 may include or provide an option to a game player to play a search query mini-game. Such mini-games may run within or outside of game 100. For example, each mini-game in game 100 may correspond to a specific task or challenge to be performed in order to progress in the game. Successful completion of a mini-game may result in in-game rewards and/or advancement in the game.

In FIG. 1A, for example, a search query mini-game is offered to a game player at 106. The game player is presented with an option 108 to select the search query mini-game. For example, option 108 may be an in-game mini-game selector, where, upon selection of the selector by a game player, the mini-game is initiated. In other examples, other actions by a game player in a game may initiate the search query mini-game. For example, upon selecting to play game 100, a game player may be provided with one or more search query mini-games throughout the game play.

In response to a selection of the mini-game, e.g., via a selection of option 108, the mini-game may be initiated. The mini-game may be a search query based challenge designed to prompt a game player to employ search results in order to complete the mini-game. In other words, a search query mini-game may be engineered to cause a game player to perform one or more searches via a search engine provided by a search server. In this way, an increase in the number of clicks on sponsored links provided with search results in the game may occur; thereby increasing revenue generated by the search engine which may be shared with a publisher of the game.

Figure 1B:
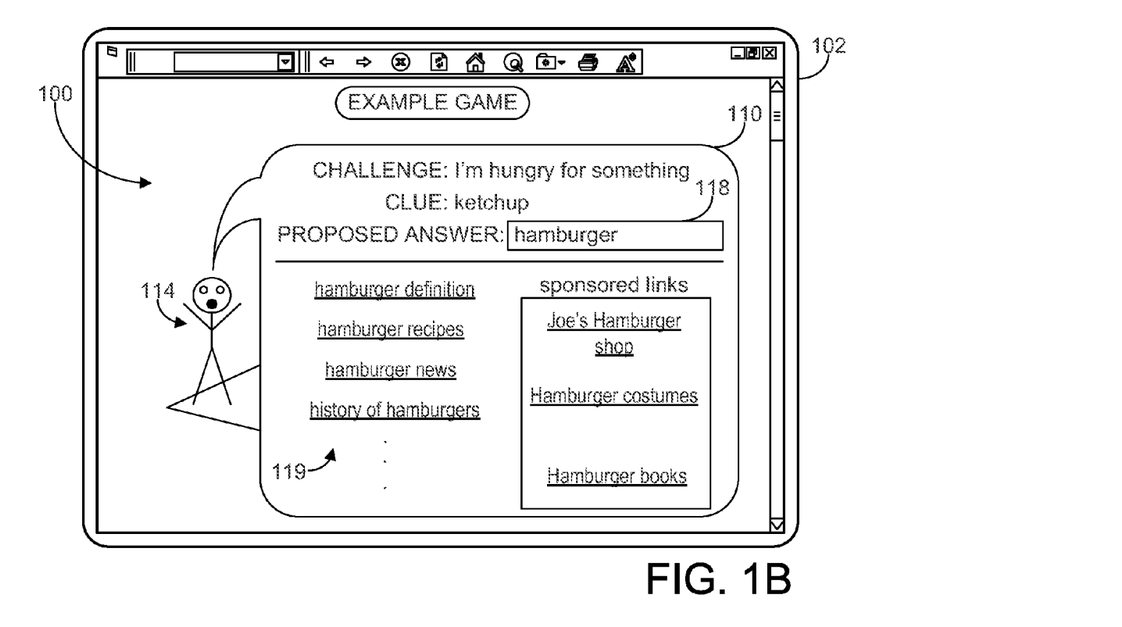

For example, as shown in FIG. 1B, a search query mini-game may be displayed to the game player as a search interface 110 within game 100. The search query mini-game may be driven by a challenge 112 provided to the game player. Challenge 112 may be any type of challenge which prompts a player to perform at least one search query. The challenge 112 may be generated by a search server and may be based on game player profile information, trending search results, time of day, etc. Additionally, challenge 112 may include a plurality of clues and a pre-determined solution.

By way of example, challenge 112 shown in FIG. 1B, is connected to a character 114 in game 100. The challenge 112 poses a word game to the game player wherein the game player guesses or proposes answers to the challenge in order to attempt to solve the challenge. For example, challenge 112 challenges the game player to determine what character 114 in game 100 is hungry for, and a solution to this example challenge is "hotdog." Clues to assist the game player in solving this example challenge include "ketchup," and "baseball."

In some examples, a predetermined number of clues may be provided to the game player to assist the game player in solving the challenge. For example, if a player cannot determine the solution based on the predetermined number of clues, then a new challenge may be provided to the player. In other examples, the number of clues provided to the game player may be substantially limitless but the mini-game may have a time limit, for example.

In the example shown in FIG. 1B, a first clue "ketchup" is provided to the game player. In response, the game player provides a guess or proposed answer upon which search results are generated. The guesses or proposed answers are one or more keywords which seed search results and sponsored links provided by a search engine.

For example, as shown in FIG. 1B, a search interface 110 is displayed within the game 100. The search interface displays the challenge question, a first clue, and an input field 118 which allows a player to input guesses or proposed answers to the challenge. Upon input of a proposed answer, e.g., "hamburger", relevant search results are provided by the search server and displayed within the mini-game. Additionally, relevant sponsored links are displayed.

The sponsored links displayed with the search results within the mini-game may be provided by one or more advertisers. Each advertiser may pay a search server provider a predetermined amount of money when a game player selects the advertiser's sponsored link. In this way, revenue may be generated for the search server provider and shared with a publisher of game 100.

Since search results and sponsored links show up when a game player is trying to solve the challenge, it may happen that a player may select a sponsored link and revenue is generated and shared. Indeed, during search query mini-game play, the game player may perform any number of searches within the search query mini-game.

In some examples, if a game player proposes an incorrect answer to the challenge, e.g., as determined by game 100 or the search server, the mini-game may continue to display a search interface with search results and sponsored links as the game players makes additional guesses or enters other keywords into the proposed answer field 118. In other examples, in response to an incorrect answer submitted by the game player, a second clue, different from the first clue, may automatically be provided to the game player. In still other examples, in response to an incorrect answer submitted by the game player, an option may be provided within the search results for a game player to receive another clue. For example, in game rewards may be based on how many clues it takes for the game player to determine the correct answer to the challenge.

Figure 1C:
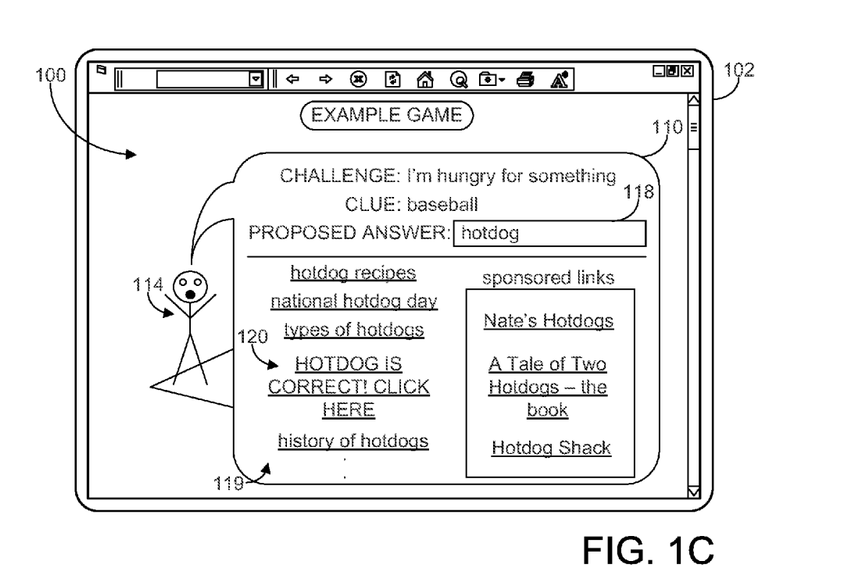
Figure 1D:
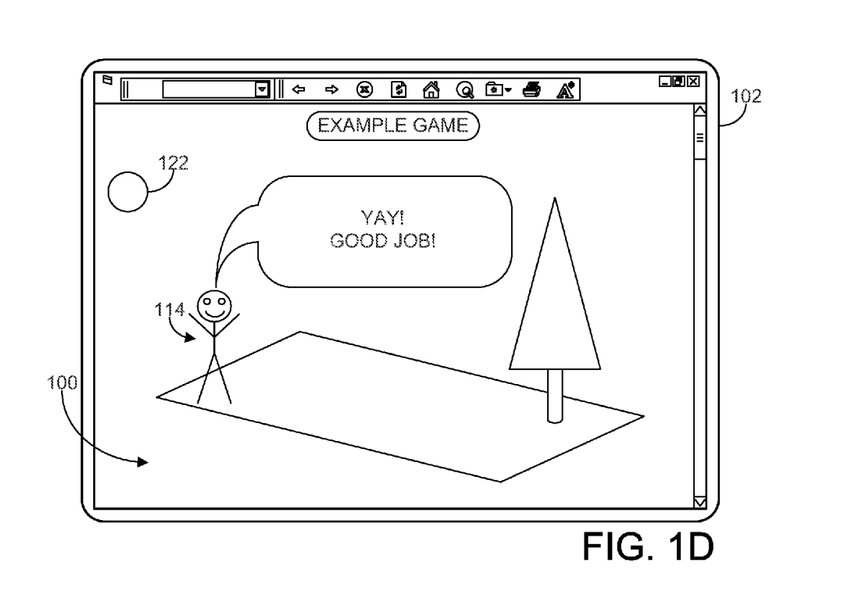

FIG. 1C shows a second, new clue, "baseball," provided to the game player to assist the game player in solving the challenge. In response to receiving the second clue, FIG. 1C shows the game player proposing the correct answer "hotdog" in input field 118. Search results, and sponsored links, relevant to the search term "hotdog" are displayed to the game player. Since, the game player submitted the correct answer in this example, the search results additionally include an answer notification 120 embedded with the search results. When the game player selects answer notification 120, the game may perform one or more predefined actions. In some examples, upon selection of the correct answer, the game player may be returned to game 100. Additionally, the game player may receive in-game rewards, e.g., virtual money 122 and/or advancement in the game, upon submitting the correct answer to the challenge.

FIG. 2 is a communications flow diagram illustrating communications among a search server 200, a game program 202, and a client device 204 of a challenge search query game system during an example challenge search query mini-game in a game published by a game publisher, according to one embodiment Client device 204 may be a computer system from which a game player accesses a game, e.g., game 100 described above.

The communications between the game program 202 and the client device 204 and the game program 202 and the search server 200 may occur over a network via a standard internet protocol, e.g., TCP/IP. In some examples, the communications between the game program 202 and the search server 200 may be handled by an application programming interface (API) running on the search server. In other examples, the search server may be configured to handle communications with the game program 202.

Game program 202 may include a plurality of games published or made available by a game publisher, including a game, such as game 100 described above, which includes at least one search query mini-game.

At 206, the game program provides or sends a game, where the game includes a least one search query mini-game, to client device 204. In some examples, the game may be sent to a client device in response to an action by the client device. For example, the client device may submit credentials to the game program to initiate or receive the game. In other examples, the game may be provided to the client device in response to an invitation by another player of the game.

While a game player at client device 204 is playing the game, at 208 the game player may perform, via client device 204, an in-game action which initiates a search query minigame within the game provided from game program 202. For example, the game player may select an in-game, mini-game selector in the game published by the game player.

At 210, in response to the game player action at 208, the game program provides a challenge query to the search server 200. For example, the API executed on the search server may be configured to receive the challenge query from the game program in response to the action (at 208) by the game player in the game.

In some examples, the challenge query may include game player profile information, e.g., geographic location information derived from a reverse IP lookup and/or game player search history, e.g., as stored in a database on search server 200. However, game player profile information included in the challenge query may not include personally identifiable information (PII) unless the player opts-in to share personally identifiable information with the search server, for example.

At 212, the search server generates a challenge. For example, the API may retrieve a challenge from the search server in response to the challenge query. For example, the challenge may be generated based on at least one database search on the search server and may be based on at least one of game player profile information and search trend data stored on the search server. In some examples, the search trend data may be dynamically computed by the search server in substantially real time. For example, the search trend data may be computed every minute, every hour, every day, etc.

At 214, the challenge is sent from search server 200 to the game program 202. In some examples, the challenge may include one or more clues and a pre-determined solution. For example, the API executed on the search server may be configured to send the challenge to the game program for display in the game provided to the client device. In some examples, the API executed on the search server may be configured to cause the game to store the challenge at 216, and provide or present a first clue to the game player at 218.

At 220, the game player inputs one or more keywords or proposed answers to try to solve the challenge. At 222, the keywords input by the game player are sent via the game program to the search server so that a search query is performed on the search server based on the keywords. For example, the API executed on the search server may be configured to receive a search query from the game program in response to providing the first clue to the game player, where the search query is based on one or more keywords input by the game player.

At 224, the search server determines whether the input keywords solve the challenge or match a solution to the challenge. For example, the API executed on the search server may be configured to cause the search server to determine if the one or more keywords are a solution to the challenge.

If it is determined that the keywords do not solve the challenge or do not match a solution to the challenge at 224, then at 228 search results and sponsored links seeded by the keywords are provided to the game player within the mini-game. For example, the API executed on the search server may be configured to provide search results and sponsored links to the game program. The game program may then send the search results and sponsored links to the client device within the game interface.

If a game player selects a sponsored link at 230, then, at 232, revenue is generated at the search server and may be shared with a publisher of the game provided to the client device from game program 202. For example, in response to the game player selecting a sponsored link via client device 204, the API executed on the search server may be configured to generate and share revenue with a game publisher of the game.

Each sponsored link included with search results generated by the search server may be provided by an advertiser, where the advertiser specifies at least one search tag and selects a network where the sponsored link is to be displayed. For example, an advertiser may assign one or more keywords to an advertisement submitted to the search server, or may specify, at the search server, one or more relevant categories related to the advertisement. In this way, the advertisement submitted by the advertiser may be displayed to a game player, as a sponsored link, when the game player inputs keywords related to the advertisement in the game.

If the game player requests a second clue at 234, the game program presents a second clue, different from the first clue, to the game player. However, in some examples, it may happen that a second clue is automatically presented to the game player after a player performs a predetermined number of searches within the game.

If keywords input by the client device at 220 are determined by the search server to solve the challenge or match a solution to the challenge at 238; then, at 240, search results, sponsored links, and a solution notification may be provided to the game player. For example, the API executed on the search server may be configured to provide search results, sponsored links, and a solution notification embedded in the search results to the game program. The game program may then send the search results, sponsored links, and solution notification to the client device within the game interface.

If the game player selects a sponsored link at 242, then, at 244, revenue is generated at the search server and may be shared with a publisher of the game provided to the client device from game program 202.

In some examples, the solution notification may be embedded within the search results. If the game player selects the solution notification at 246, the game program may perform a predefined action at 248. For example, the API executed on the search server may be configured to send a message to the game program to perform a predefined action in response to the game player selecting the solution notification. For example, the game player may be returned to the game and in-game rewards may be provided by the game program.

In some embodiments, the above described methods and processes may be tied to various computing systems including one or more computers. In particular, the methods and processes described herein may be implemented as a computer application, computer service, computer API, computer library, and/or other computer program product.

For example, FIG. 3 FIG. 3 is a schematic view of a challenge search query game system, according to one embodiment. Namely, FIG. 3 schematically shows computing systems 300 in accordance with an embodiment of present disclosure including a search server 200, a game program 202, and a client device 204. The game program 202 may include one or both of a server-side game program component 328 on a game server 301 and a client-side-game program component 326 on client device 204.

Search server 200 is a computing system including an application programming interface 304 (API), a search engine 306, a ranker algorithm 308, at least one database 310, a mini-game program 320, and an ad interface 322.

Application programming interface 304 handles the communications between the search server and the game program, e.g., the communications described above with regard to FIG. 2. For example, application programming interface 304 may be configured to receive a search query from the game program and pass the query to search engine 306. In some example, such queries may be passed with an identification based on a game player's profile information.

Search engine 306 drives the challenges presented in a search query mini-game within a game published by a game player, e.g., as described above. Further, search engine 306 may dynamically alter the challenges sent to a game program based on game player profile information and/or search trend data, e.g., stored in database 310. For example, types of challenges presented to a game player in a mini-game may be engineered to target sponsored links to a specific game player.

Ranker algorithm 308 may be configured to analyze search data to determine trending search results which may be stored in database 310.

Database 310 may be queried during generation of challenges sent to the game program during a mini-game. Database 310 may include a variety of search trend data. In some examples, search trend data may be game player specific, e.g., based on a specific game player's search history, profile information, etc.

Mini-game program 320 includes a variety of game specific algorithms. For example, mini-game program 320 may determine a type of mini-game included in a game published by a game publisher, so that challenges generated on the search server may be tailored to a specific type of game.

Ad interface 322 is configured to provide an interface for advertisers to submit and/or bid on advertisements which may be displayed on various networks which use the search capabilities of search server 200. For example, via ad interface 322, advertisers can specify key words, tags, times, locations, etc. corresponding to an advertisement. In some examples, advertisers may specify which networks served by the search server to publish ads to. For example, an advertiser may select to publish an ad to a particular game or to an entire game space.

Game program 202 may include one or both of a client-side game program component 326 and a server-side game program component 328. Client-side game program component 326 may be implemented on client device 204 to provide a game to a game player. For example, client-side game program component 326 may be an executable program running on client device 204. Server-side game program component 328 may be executed on game server 301. In some examples, game server 301 may handle all communications with search server 200 during game play.

Game program 202 is a computing system which includes at least one game including a search query mini-game which may be provided to a game player. In some examples, game program 202 may provide challenge queries to the search server based on in-game categories or actions.

Client device 204 is a computing system via which a game player accesses and plays games published by a game publisher and provided by game program 202. For example, client device 204 may be a personal computer, a mobile device, a cell phone, etc.

A communication system 302 may be configured to communicatively couple the computing systems shown in FIG. 3 with each other and one or more other computing devices. Communication system 302 may include wired and/or wireless communication devices compatible with one or more different communication protocols. As nonlimiting examples, the communication system may be configured for communication via a wireless telephone network, a wireless local area network, a wired local area network, a wireless wide area network (WAN), a wired wide area network, etc. In some embodiments, the communication system may allow the computing systems to send and/or receive messages to and/or from other devices via a network such as the Internet Each computing system shown in FIG. 3, e.g., search server 200, game program 202, and client device 204, is shown in simplified form and may perform one or more of the above described methods and processes. It is to be understood that virtually any computer architecture may be used without departing from the scope of this disclosure. In different embodiments, each computing system may take the form of a mainframe computer, server computer, desktop computer, laptop computer, tablet computer, home entertainment computer, network computing device, mobile computing device, mobile communication device, gaming device, etc.

Each computing system shown in FIG. 3 may include a logic subsystem and a data-holding subsystem. Each computing system may optionally include a display subsystem, communication subsystem, and/or other components not shown in FIG. 3. Each computing system may also optionally include user input devices such as keyboards, mice, game controllers, cameras, microphones, and/or touch screens, for example.

A logic subsystem included in each computing system shown in FIG. 3 may include one or more physical devices configured to execute one or more instructions. For example, a logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

A logic subsystem included in each computing system shown in FIG. 3 may include one or more processors that are configured to execute software instructions. Additionally or alternatively, the logic subsystems may include one or more hardware or firmware logic machines configured to execute hardware or firmware instructions. Processors of the logic subsystems may be single core or multicore, and the programs executed thereon may be configured for parallel or distributed processing. The logic subsystems may optionally include individual components that are distributed throughout two or more devices, which may be remotely located and/or configured for coordinated processing. One or more aspects of the logic subsystems may be virtualized and executed by remotely accessible networked computing devices configured in a cloud computing configuration.

Data-holding subsystems included in each computing device shown in FIG. 3 may include one or more physical, non-transitory, devices configured to hold data and/or instructions executable by the logic subsystem to implement the herein described methods and processes. When such methods and processes are implemented, the state of the data-holding subsystems may be transformed (e.g., to hold different data).

The data-holding subsystems may include removable media and/or built-in devices. The data-holding subsystems may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystems may include devices with one or more of the following characteristics: volatile, nonvolatile, dynamic, static, read/write, read-only, random access, sequential access, location addressable, file addressable, and content addressable. In some embodiments, the logic subsystems and the data-holding subsystem may be integrated into one or more common devices, such as an application specific integrated circuit or a system on a chip.

In some example, one or more of the data-holding subsystems may be in the form of removable computer-readable storage media, which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

The terms "module," "program," and "engine" may be used to describe an aspect of the computing systems shown in FIG. 3 that is implemented to perform one or more particular functions. In some cases, such a module, program, or engine may be instantiated via a logic subsystem executing instructions held by a corresponding data-holding subsystem. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client device.

When included, a display subsystem may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. Display subsystems may include one or more display devices utilizing virtually any type of technology. Such display devices may be combined with logic subsystems and/or data-holding subsystems in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A challenge search query game system, comprising:
a search server computing device configured to:
receive a challenge query from a game program in response to an in-game action by a game player;
retrieve a challenge in response to the challenge query, the challenge including one or more clues and a solution;
send the challenge to the game program for display in the game, causing the game program to store the challenge and present a first clue from the one or more clues to the game player;
receive a search query from the game program in response to providing the first clue to the game player, the search query based on one or more keywords input by the game player;
provide search results based on the search query to the game program;
determine if the one or more keywords match the solution to the challenge; and
if the one or more keywords match the solution to the challenge:
provide search results, sponsored links, and a solution notification embedded in the search results to the game program;
send a message to the game program to perform a predefined action in response to the game player selecting the solution notification; and
in response to the game player selecting a sponsored link, generate and share revenue with a game publisher of the game.

2. The system of claim 1, wherein the predefined action includes an in-game reward in a game published by the game publisher.

3. The system of claim 1, wherein the search server computing device is further configured to:
if the one or more keywords do not match the solution to the challenge:
provide search results, sponsored links, and a second clue to the game program, where the second clue is different from the first clue.

4. The system of claim 1, wherein the in-game action is a selection of a mini-game selector in a game published by the game publisher.

5. The system of claim 1, wherein the challenge query includes game player profile information.

6. The system of claim 1, wherein the challenge is based on at least one of game player profile information and search trend data stored on the search server computing device.

7. The system of claim 1, wherein the search server computing device is further configured to return the game player to the game in response to the game player selecting the solution notification.

8. The system of claim 1, wherein the challenge is based on at least one database search on the search server computing device, the database including search trend data, wherein the search trend data is computed by the search server computing device substantially in real time.

9. A challenge search query game system, comprising:
a search server computing system configured to execute an application programming interface (API), the API being configured to:
receive a challenge query from a game program in response to a selection by a game player of a mini-game selector in a game published by a game publisher, the challenge query including game player profile information;
retrieve a challenge in response to the challenge query, the challenge including one or more clues and a solution, the challenge based on at least one of game player profile information and search trend data stored on the search server computing system;

send the challenge to the game program for display in the game, causing the game program to store the challenge and present a first clue from the one or more clues to the game player;

receive a search query from the game program in response to providing the first clue to the game player, the search query based on one or more keywords input by the game player;

cause the search server computing system to determine if the one or more keywords match the solution to the challenge;

if the one or more keywords match the solution to the challenge:

provide search results, sponsored links, and a solution notification embedded in the search results to the game program; and in response to the game player selecting the solution notification, send a message to the game program to return the game player to the game and provide an in-game reward in the game;

if the one or more keywords do not match the solution to the challenge:

provide search results and sponsored links; and in response to an action by the game player, present a second clue to the game program, where the second clue is different from the first clue; and in response to the game player selecting a sponsored link, generate and share revenue with the game publisher of the game.

10. The system of claim 9, wherein the game player profile information includes geographic location information derived from a reverse IP lookup.

11. The system of claim 9, wherein the game player profile information includes player search history and does not include personally identifiable information unless the player opts-in to share personally identifiable information with the search server computing system.

12. The system of claim 9, wherein each sponsored link is provided by an advertiser, where the advertiser specifies at least one search tag and selects a network where the sponsored link is displayed.

13. The system of claim 9, wherein the challenge is based on at least one database search on the search server computing system, the database including search trend data, wherein the search trend data is computed by the search server computing system substantially in real time.

14. A method for integrating search into a game published by a game publisher on a computing device, comprising:

on a search server computing device:

receiving a challenge query from a game program in response to a selection of a mini-game selector in a game published by the game publisher;

retrieving a challenge in response to the challenge query, the challenge including one or more clues and a solution; and sending the challenge to the game program for display in the game, causing the game program to store the challenge and present a first clue from the one or more clues to the game player;

receiving a search query from the game program in response to providing the first clue to the game player, the search query based on one or more keywords input by the game player;

providing search results based on the search query to the game program;

determining if the one or more keywords match the solution to the challenge; and if the one or more keywords match the solution to the challenge:

providing search results, sponsored links, and a solution notification embedded in the search results to the game program; and sending a message to the game program to perform a predefined action in response to the game player selecting the solution notification; and in response to the game player selecting a sponsored link, generating and sharing revenue with the game publisher of the game.

15. The method of claim 14, further comprising:

if the one or more keywords do not match the solution to the challenge:

providing search results, sponsored links, and a second clue to the game program, where the second clue is different from the first clue.

\* \* \* \* \*